United States Patent
Hoppe

(12) 
(10) Patent No.: US 6,676,348 B2
(45) Date of Patent: Jan. 13, 2004

(54) EXPANSION ANCHOR WHICH CAN BE FIXED TO A PANEL-TYPE BUILDING MATERIAL

(75) Inventor: Hartmut Hoppe, Horb (DE)

(73) Assignee: fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 10/276,368
(22) PCT Filed: May 8, 2001
(86) PCT No.: PCT/EP01/05176
§ 371 (c)(1), (2), (4) Date: Nov. 15, 2002
(87) PCT Pub. No.: WO01/92736
PCT Pub. Date: Dec. 6, 2001

(65) Prior Publication Data
US 2003/0108397 A1 Jun. 12, 2003

(30) Foreign Application Priority Data
May 30, 2000 (DE) .......................... 100 26 886

(51) Int. Cl.⁷ ............................ F16B 13/04; F16B 13/06
(52) U.S. Cl. ............................. 411/48; 411/41; 411/45; 411/55
(58) Field of Search ............................. 411/41, 43, 46, 411/47, 48, 50, 51, 55, 45

(56) References Cited

U.S. PATENT DOCUMENTS 2,159,580 A    5/1939   Zifferer
6,048,149 A  * 4/2000   Garcia ...................... 411/48 X
6,322,305 B1 * 11/2001  Bantle ...................... 411/48 X
6,406,235 B1 * 6/2002   Bantle ...................... 411/41 X

FOREIGN PATENT DOCUMENTS

| DE | 2460431      | * | 6/1976  | ............... 411/41 |
| DE | 196 864 A    |   | 6/1998  |                        |
| DE | 197 20 033 A1|   | 11/1998 |                        |
| EP | 0 503 677 A  |   | 9/1992  |                        |

* cited by examiner

*Primary Examiner*—Neill Wilson
(74) *Attorney, Agent, or Firm*—Michael J. Striker

(57) ABSTRACT

The invention relates to an expansible anchor (10) for fastening to a panel-shaped building material, having an anchor sleeve (12) with forwardly projecting expansion tongues (18) that can be spread open by drawing in an expander body (24) having an expander cone (26). The invention proposes to form the expansible anchor (10) with a locking connection (20, 36) which locks the expander body (24) on the expansible anchor (10) in a position in which the expander body (24) is drawn in between the expansion tongues (18) and holds the expansion tongues (18) in a spread-open position. The invention has the advantage that the expander body (24) remains in its position in which it is drawn in between the expansion tongues (18) and holds the expansion tongues in a spread-open position even when an expander screw is unscrewed from the expansible anchor (10).

4 Claims, 1 Drawing Sheet

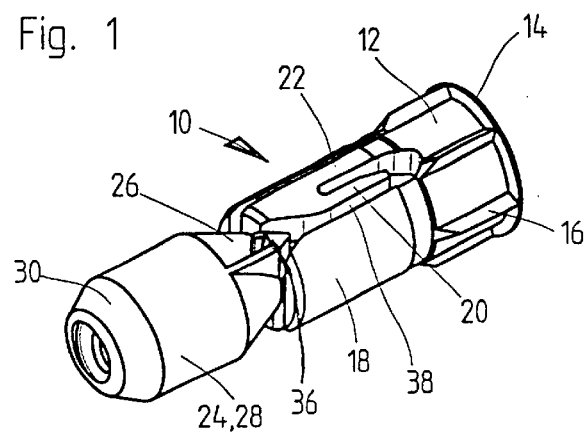
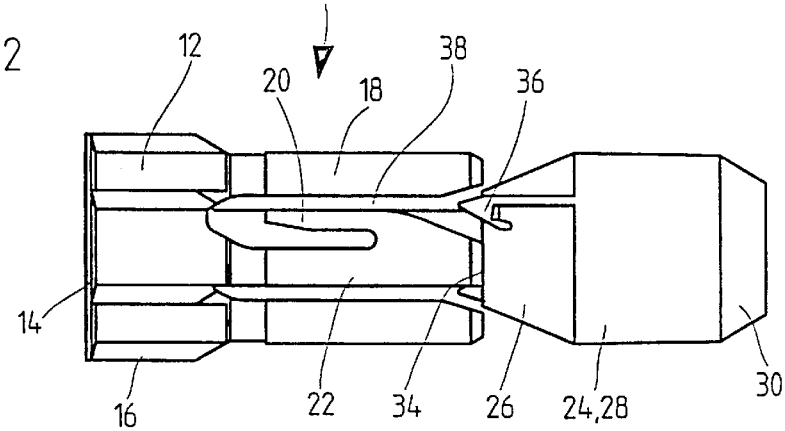
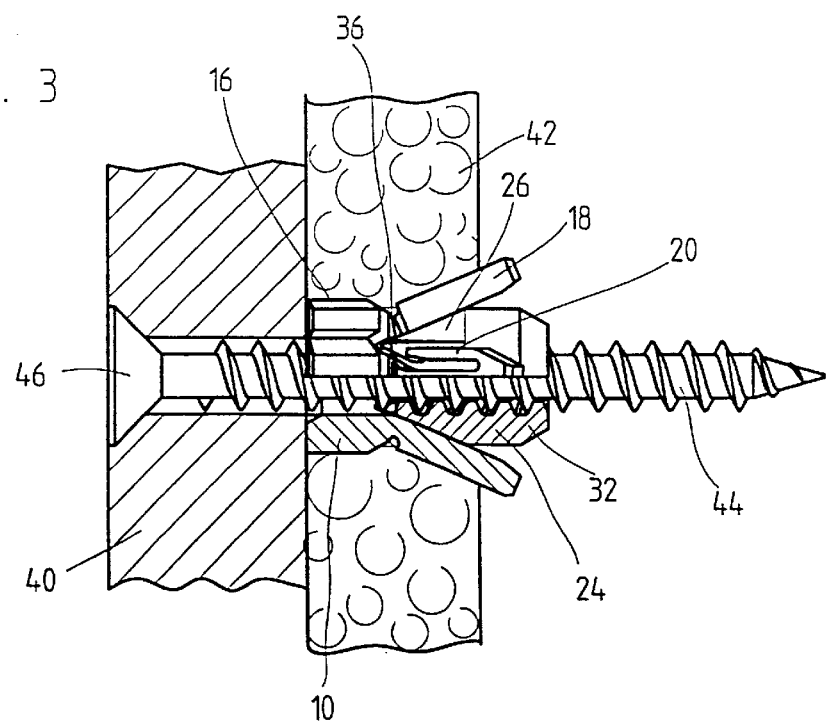

EXPANSION ANCHOR WHICH CAN BE FIXED TO A PANEL-TYPE BUILDING MATERIAL

BACKGROUND OF THE INVENTION

The invention relates to an expansible anchor for fastening to a panel-shaped building material. A panel-shaped building material is, for example, a plasterboard panel or a panel made of some other building material. It may also be, for example, the wall of a hollow block or the like. The expansible anchoring according to the invention is also suitable for anchoring in a soft, for example porous, building material, such as aerated concrete.

An expansible anchor of this kind is known from DE 197 20 033 A1. The known expansible anchor has an anchor sleeve having expansion tongues projecting forwards from the anchor sleeve. Furthermore, the known expansible anchor has an expander body in the form of an expander cone which is arranged in front of the expansion tongues. For spreading open the expansion tongues, the expander body is drawn in between the expansion tongues by screwing in an expander screw, the expander body pushing the expansion tongues apart, that is to say spreading them open. The spread-open expansion tongues engage behind the panel-shaped building material and thus anchor the expansible anchor interlockingly against the building material.

The known expansible anchor has the disadvantage that the expander body falls out from between the expansion tongues if the expander screw is unscrewed from the expansible anchor or at the latest, when a fresh attempt is made to screw the expander screw into the expansible anchor, if the expander screw is pressed with a slight axial pressure against the expander body. It may be necessary, or at least desirable, to unscrew the expander screw after the expansible anchor has been anchored, for example for renovation purposes or when an article fastened using the expansible anchor is to be replaced or removed. The known expansible anchor, once anchored, cannot be re-used; its anchor sleeve must be removed after unscrewing from the drilled hole and a fresh expansible anchor used. The expander body remains in the inaccessible cavity on the rear side of the panel-shaped building material.

SUMMARY OF THE INVENTION

The invention is based on the problem of developing an expansible anchor of the kind described above so that it can be re-used after a screwed-in expander screw has been unscrewed.

This problem is solved according to the invention. The expansible anchor according to the invention has a locking connection which engages when the expander body is drawn in between the expansion tongues. In the engaged state, the locking connection holds the expander body of the expansible anchor according to the invention in the position of the anchor sleeve in which it is drawn in between the expansion tongues. As a result, after the expander screw has been unscrewed the expander body remains in the position in which it is drawn in between the expansion tongues. Even if the expander screw is subsequently re-inserted into the expansion anchor and an axial pressure exerted on the expander body by the expander screw, the locking connection of the expansible anchor according to the invention holds the expander body in the position in which it is engaged between the expansion tongues. Because the expander body in the position in which it is drawn in between the expansion tongues hold the expansion tongues in a spread-open position, the locking connection has the effect that the expansible anchor according to the invention remains anchored against the building material even when the expander screw is unscrewed. The expansible anchor according to the invention accordingly has the advantage that its expander body cannot be lost when the expander screw is unscrewed after the expansible anchor has been anchored. A further advantage of the expansible anchor according to the invention is that it remains anchored in the building material even after the expander screw has been unscrewed. The locking connection between the expander body and the anchor sleeve an also be effected indirectly by way of the expansion tongues, that is to say that the expander body is locked together with the expansion tongues.

In a variant of the invention the expansible anchor has one or more locking hooks arranged substantially axially parallel, which forms a locking connection together with a locking tongue which is likewise arranged substantially axially parallel. In the engaged state, the locking hook engages over a free end of the locking tongue and thus holds the expander body in the position in which it is drawn in between the expansion tongues. At the same time, the locking hook can be connected to the expander body or the anchor sleeve, while the locking tongue is connected to the respective other of those two components. The looking hook and/or the locking tongue are resilient.

In a development of the invention the expansible anchor has an anti-rotation device which holds or guides the expander body non-rotatably on the anchor sleeve. The anti-rotation device prevents the expander body from co-rotating with the expander screw when the expander screw is screwed into the expansible anchor. The anti-rotation device can have, for example, a lug, rib or the like, which engages between the expansion tongues and thus guides the expander body non-rotatably but axially displaceably on the anchor sleeve. In variants of the invention it is also possible for the locking hook and/or the locking tongue of the locking device to form the anti-rotation device.

In a preferred variant of the invention the expander body and the anchor sleeve are formed integrally with one another, they are connected to one another by way of a predefined breakage point which is broken, for example it tears off, when the expander body is drawn in between the expansion tongues. This variant of the invention enables the expansible anchor according to the invention to be made in one piece and has the further advantage that the expander body is captively connected to the anchor sleeve until the expander screw is screwed in.

In a preferred variant, the expansible anchor according to the invention is produced from plastics, for example by injection-moulding or transfer-moulding. This enables the expansible anchor according to the invention to be manufactured economically. The expander body and the anchor sleeve can especially be produced in one piece from plastics without difficulty and in one operation.

BRIEF DESCRIPTION OF THE DRAWINGS

The invention will be described in greater detail below with reference to an exemplary embodiment shown in the drawing.

FIG. 1 is a perspective view of an expansible anchor according to the invention;

FIG. 2 is a side view of the expansible anchor of FIG. 1; and

FIG. 3 is a half sectional view of the expansible anchor of FIG. 1 in use.

The Figures are to different scales.

DESCRIPTION OF THE PREFERRED EMBODIMENTS

The expansible anchor 10 according to the invention shown in FIGS. 1 and 2 is produced in one piece by injection-moulding from plastics. It has an anchor sleeve 12 which forms the rear end of the expansible anchor 10. The anchor sleeve 12 has a radially outwardly projecting depth-setting collar 14 at its rear end. Furthermore, axially parallel anti-rotation ribs 16 project from the anchor sleeve 12 in a star shape, which ribs 16 are intended to prevent the expansible anchor 10 from co-rotating when an expander screw (not shown in FIGS. 1 and 2) is screwed in.

Expansion tongues 18 project forwards from the anchor sleeve 12. In the embodiment shown and being described, the expansible anchor 10 has two expansion tongues 18 which each extend over a portion of the periphery of the expansible anchor 10 and which are spaced apart from one another in the embodiment shown. The expansion tongues 18 are formed integrally with the anchor sleeve 12, they project, in extension of the wall of the anchor sleeve 12, from the forward end thereof remote from the depth-setting collar 14.

In an intermediate space between the expansion tongues 18 the expansible anchor 10 has locking tongues 20 the free ends of which face the anchor sleeve 12. At the end remote from the anchor sleeve 12, the locking tongues 20 merge into a connector 22 which connects the far end of the locking tongues 20 integrally with the anchor sleeve 12. The connector 22 extends axially parallel to the expansible anchor 10 and is arranged between the locking tongues 20 in the peripheral region of the expansible anchor 10. The locking tongues 20 are resilient in the peripheral direction.

At a free, forward end of the expansion tongues 18 remote from the anchor sleeve 12, there is arranged an expander body 24. The expander body 24 has an expander cone 26 at its end facing the expansion tongues 18, it then merges into a cylindrical portion 28 and terminates at the forward end in a tapering cone (chamfer 30). The expander body 24 has a continuous internal thread 32 (FIG. 3).

The expander body 24 is integrally connected with the connectors 22 of the locking tongues 20 by way of a predefined breakage point 34. The predefined breakage points 34 are areas of thin material which break when the expander body 24 is drawn in between the expansion tongues 18 (to be described below). All the elements of the expansible anchor 10 according to the invention are therefore integral with one another and are produced in one operation by injection-moulding from plastics.

Two locking hooks 36 are formed integrally at the side of the expander cone 26, which locking hooks 36 are arranged opposite one another. The locking hooks 36 do not project radially beyond the periphery of the expansible anchor 10, they are arranged as an extension of a slot 38 between the locking tongues 20 and the expansion tongues 18. The position and arrangement of the locking hooks can readily be seen in FIG. 1.

The use of the expansible anchor 10 according to the invention in shown in FIG. 3. The expansible anchor 10 serves for fastening an article 40 to a plasterboard panel 42, for example. For fastening, the expansible anchor 10, in its initial state shown in FIGS. 1 and 2, is inserted into a drilled hole passing through the plasterboard panel 42 until its depth-setting collar 14 rests against the surface of the plasterboard panel 42, the anti-rotation ribs 16 pressing into the plasterboard and preventing the expansible anchor 10 from co-rotating when an expander screw 44 is subsequently screwed in. After the expansible anchor 10 has been inserted into the drilled hole, the article 40 to be fastened is placed onto the plasterboard panel 42 and the expander screw 44 is inserted through a drilled hole in the article 40 and into the expansible anchor 10. The expander screw 44 is able to pass through the anchor sleeve 12 and the expansion tongues 18 as far as the expander body 24. The expander screw 44 is screwed into the expander body 24. As soon as the screw head 46 of the expander screw 44 comes to rest against the article 40 to be fastened, the expander screw 44 draws the expander body 24 in between the expansion tongues 18. As the expander body 24 begins to be drawn in between the expansion tongues 18, the predefined breakage points 34 break, so that the expander body 24 can be drawn in between the expansion tongues 18. On being drawn in between the expansion tongues 18, the expander cone 26 of the expander body 24 pushes the expansion tongues 18 apart, the expander body 24 spreads open the expansion tongues 18 and thus anchors the expansible anchor 10 interlockingly against the plasterboard panel 42.

As the expander body 24 is drawn in between the expansion tongues 18, the pocking hooks 36 of the expander body 24 move into the slot 38 between the locking tongues 20 and the expansion tongues 18. At the same time, the locking hooks 36 push the locking tongues 20 resiliently aside in the peripheral direction. As soon as the locking hooks 36 have passed the free ends of the locking tongues 20 facing the anchor sleeve 12, the locking tongues 20 spring back and into the locking hooks 36. The locking hooks 36 engage over the locking tongues 20 at their free ends, the locking hooks 36 of the expander body 24 are locked together with the expansion tongues 18 of the anchor sleeve 12. The locking hooks 36 and the locking tongues 20 form a locking connection 20, 36 which hold the expander body 24 in the position in which it is drawn in between the expansion tongues 18. In that position the expander body 24 holds the expansion tongues 18 in a spread-open position. By means of the locking connection 20, 36 between the expander body 24 and the anchor sleeve 12, the expander body 24 remains in the position in which it is drawn in between the expansion tongues 18 and holds the expansion tongues 18 in a spread-open position, even when the expander screw 44 is unscrewed from the expansible anchor 10. The expansible anchor 10 thus remains anchored in the plasterboard panel 42 even after the expander screw 44 has been unscrewed, and the expander screw 44 can repeatedly be unscrewed and screwed in again without problems.

On being drawn in between the expansion tongues 18, the expander cone 26 of the expander body 24 pushes apart not only the expansion tongues 18 but also the connectors 22 between the locking tongues 20 and the anchor sleeve 12, that is to say on being drawn in between the expansion tongues 18 the expander body 24 also spreads open the connectors 22. The connectors 22 thus likewise form expansion tongues or expansion elements which are spread open and anchor the expansible anchor 10 interlockingly against the plasterboard panel 42.

The locking hooks 36, which pass into the slot 38 between the locking tongues 20 and the expansion tongues 18 when the expander body 24 is drawn in between the expansion tongues 18, form an anti-rotation device 18, 20, 36, 38, which prevents the expander body 24 from rotating relative to the anchor sleeve 12 and thus prevents the expander body 24 from co-rotating with the expander screw 44 when the expander body 24 is being drawn in between the expansion tongues 18.

What is claimed is:

1. Expansible anchor for fastening to a panel-shaped building material, having an anchor sleeve with forwardly projecting expansion tongues that can be spread open by drawing in an expander body between the expansion tongues, characterized in that the expansible anchor (10) has a locking connection (20, 36) which engages when the expander body (24) is drawn in between the expansion tongues (18) and connects the expander body (24), in a position in which it is drawn in between the expansion tongues (18) and holds the expansion tongues (18) in a spread-open position, to the anchor sleeve (12), and in that the locking connection (20, 36) has a locking hook (36) which in the engaged stated engages over a free end of a locking tongue (20) arranged substantially parallel to an axis of the anchor, the locking hook (36) being connected to the expander body (24) or the anchor sleeve (12), and the locking tongue (20) being connected to the respective other of those two components (12, 24), and the locking hook (36) and/or the locking tongue (20) being resilient.

2. Expansible anchor according to claim 1, characterized in that the expansible anchor (10) has an anti-rotation device (18, 20, 36, 38) which holds the expander body (24) non-rotatably against the anchor sleeve (12).

3. Expansible anchor according to claim 1, characterized in that the expander body (24) is integral with the anchor sleeve (12) by way of a predefined breakage point (34).

4. Expansible anchor according to claim 1, characterized in that the expansible anchor (10) consists of plastics.

* * * * *